(12) United States Patent
Roberge et al.

(10) Patent No.: US 9,956,899 B2
(45) Date of Patent: May 1, 2018

(54) AIR CONVEYING SYSTEM FOR FILLING OF AIR SEEDER TANK

(71) Applicant: CNH Industrial Canada, Ltd., Saskatoon (CA)

(72) Inventors: Martin J. Roberge, Saskatoon (CA); Graham Douglas Stuart, Glaslyn (CA); Ka Po Catherine Hui, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days. days.

(21) Appl. No.: 15/657,753

(22) Filed: Jul. 24, 2017

(65) Prior Publication Data
US 2017/0320421 A1 Nov. 9, 2017

Related U.S. Application Data

(62) Division of application No. 14/301,717, filed on Jun. 11, 2014, now Pat. No. 9,738,200.

(51) Int. Cl.
*B65G 53/14* (2006.01)
*B60P 1/00* (2006.01)
(Continued)

(52) U.S. Cl.
CPC ............ *B60P 1/00* (2013.01); *A01C 7/082* (2013.01); *A01C 15/003* (2013.01);
(Continued)

(58) Field of Classification Search
CPC ........ B65B 53/44; B65G 53/14; B65G 53/44; B65G 53/56; B60P 1/00; B60P 1/60; A01C 7/081
(Continued)

(56) References Cited

U.S. PATENT DOCUMENTS 3,010,766 A * 11/1961 Coski .................... B65G 53/00
                                                            406/106
3,693,840 A *  9/1972 Starr ....................... A21C 9/04
                                                            406/129
(Continued)

FOREIGN PATENT DOCUMENTS

WO    WO 2005/099433 A1    10/2005

OTHER PUBLICATIONS

"An Investigation of Air Seeder Component Characteristics", R.K. Allam, P. Eng. E. and H. Wiens, P. Eng., American Society of Agricultural Engineers (15 pages).

*Primary Examiner* — Joseph Dillon, Jr.
(74) *Attorney, Agent, or Firm* — Rebecca L. Henkel; Rickard K. DeMille (57) ABSTRACT

An air cart for distributing air entrained particulate material from a chamber or tank to a plurality of distribution lines for application to an agricultural field has a tank refilling feature utilizing air flow from the cart distribution system or from a dedicated pneumatic source. The cart conveying system air flow is diverted and passed through an assembly containing multiple venturis which also receives particulate material from a supply source. The air entrained material from the source is conveyed to and gently deposited in the cart tank. Exhaust air from the tank may be directed back into the cart conveying system or vented through an air diffuser located beneath the cart. Exhaust air which is directed back to the cart conveying system may return to a location closely adjacent that from which it was originally diverted.

7 Claims, 9 Drawing Sheets

(51) Int. Cl.
    *B65G 53/56*     (2006.01)
    *B60P 1/60*     (2006.01)
    *A01C 15/00*     (2006.01)
    *A01C 7/08*     (2006.01)
    *B65G 53/46*     (2006.01)

(52) U.S. Cl.
    CPC .............. *A01C 15/006* (2013.01); *B60P 1/60* (2013.01); *B65G 53/56* (2013.01); *B65G 53/14* (2013.01); *B65G 53/4633* (2013.01); *Y02P 60/16* (2015.11)

(58) Field of Classification Search
    USPC ................ 406/106, 92, 127, 144, 183, 197; 414/507; 111/174
    See application file for complete search history.

(56) References Cited

U.S. PATENT DOCUMENTS

| | | | | |
|---|---|---|---|---|
| 3,694,037 | A * | 9/1972 | Feder | B65G 53/06 406/106 |
| 4,500,038 | A * | 2/1985 | De Ferrari | B05B 7/1404 118/312 |
| 4,779,765 | A * | 10/1988 | Neumeyer | A01C 7/06 111/174 |
| 4,787,783 | A * | 11/1988 | Girardelli | B65G 53/06 406/106 |
| 4,900,200 | A * | 2/1990 | Harumoto | B65G 53/26 406/106 |
| 5,042,209 | A | 8/1991 | Furrer | |
| 5,478,172 | A * | 12/1995 | Oura | B01F 15/00194 406/106 |
| 5,575,225 | A * | 11/1996 | Smith | A01C 15/003 111/174 |
| 5,727,909 | A * | 3/1998 | Laird | D01G 23/08 406/106 |
| 5,803,673 | A * | 9/1998 | Reinsch | B65D 88/30 406/106 |
| 5,878,679 | A | 3/1999 | Gregor et al. | |
| 5,980,163 | A | 11/1999 | Gregor et al. | |
| 6,264,806 | B1 | 7/2001 | Kaufman et al. | |
| 6,283,679 | B1 | 9/2001 | Gregor et al. | |
| 6,890,129 | B2 * | 5/2005 | Fabbri | B01D 29/01 406/106 |
| 7,104,207 | B2 | 9/2006 | Wake et al. | |
| 7,476,060 | B2 * | 1/2009 | Boroch | B65G 67/06 406/39 |
| 8,443,742 | B2 | 5/2013 | Orrenius | |
| 8,522,700 | B2 | 9/2013 | Landphair | |
| 8,635,963 | B2 | 1/2014 | Friggstad | |
| 8,882,401 | B2 * | 11/2014 | Kinoshita | B65G 53/40 406/106 |
| 8,992,133 | B2 * | 3/2015 | Sundholm | B65F 5/005 141/7 |
| 2002/0020461 | A1 * | 2/2002 | Platsch | B05B 7/1404 141/153 |
| 2004/0042335 | A1 * | 3/2004 | Cecala | A01C 23/042 366/151.1 |
| 2011/0035163 | A1 * | 2/2011 | Landphair | A01C 7/081 702/45 |
| 2011/0054706 | A1 | 3/2011 | Murphy | |
| 2011/0293380 | A1 * | 12/2011 | Stuke | B23P 19/005 406/22 |
| 2012/0070236 | A1 * | 3/2012 | Kinoshita | B65G 53/40 406/108 |
| 2012/0217239 | A1 * | 8/2012 | Vandervoort | B60K 15/0406 220/86.2 |
| 2012/0316736 | A1 * | 12/2012 | Hubalek | A01B 79/005 701/50 |
| 2013/0032363 | A1 * | 2/2013 | Curry | A01C 7/205 172/4 |
| 2013/0247803 | A1 * | 9/2013 | Heintzman | A01C 7/082 111/176 |
| 2013/0333765 | A1 * | 12/2013 | Fox | G01N 1/286 137/2 |
| 2014/0045409 | A1 * | 2/2014 | Zhang | B24C 7/0046 451/2 |
| 2015/0368039 | A1 * | 12/2015 | Cochrum | B65D 88/66 406/75 |
| 2016/0050843 | A1 * | 2/2016 | Roberge | B65G 53/16 406/122 |
| 2016/0090019 | A1 * | 3/2016 | Roberge | B60P 1/60 414/507 |
| 2016/0122137 | A1 * | 5/2016 | Schilling | A01C 15/003 406/170 |

\* cited by examiner

AIR CONVEYING SYSTEM FOR FILLING OF AIR SEEDER TANK

CROSS REFERENCE TO RELATED APPLICATIONS

This divisional patent application is based on and takes priority from U.S. patent application Ser. No. 14/301,717 filed Jun. 11, 2014, entitled, "AIR CONVEYING SYSTEM FOR FILLING OF AIR SEEDER TANK," which is hereby incorporated by reference herein in its entirety.

BACKGROUND OF THE INVENTION

1. Field of the Invention

The present invention relates to farm implements and, more particularly, to an apparatus for supplying particulate material such as seed, fertilizer, herbicide or insecticide to one or more tanks of an air seeder. The invention may also be used with other farm implements such as a planter or fertilizer application equipment.

2. Description of the Related Art

Air seeder systems include a traction unit with an air cart in tow and frequently include a third unit such as a cultivator either intermediate the traction unit and air cart or towed behind the air cart. Agricultural implements that employ an air seeder system to apply seed, fertilizer, or other particulate material, either sub-surface or to the surface of a farm field, typically have a material supply source such as one or more tanks that are loaded with the particulate material. The tanks have or are associated with a metering device, which typically consists of a rotating element, which meters the particulate material from the tanks into a set of distribution channels, such as conduits, hoses, etc., for application to the farm field. In most systems, a pneumatic source such as a fan or blower provides air to convey and distribute material through the distribution channels. Periodically, the tank's supply of particulate material must be replenished. Typically, a screw auger or belt conveyor feeds the material from a source such as a supply vehicle to the tank. Grain augers, conveyor belts and similar mechanical seed handling equipment may cause damage to certain types of seeds. The delivery of canola seeds in particular is a delicate process. Seeds are expensive and physical damage to seeds may affect their germination and germination rate, thus, damage to the seeds while filling the tanks should be minimized.

What is needed in the art is an agricultural product conveying system which minimizes product damage.

SUMMARY OF THE INVENTION

The present invention provides an agricultural product air conveyor system which minimizes the likelihood of product damage while maximizing the product flow rate in filling and refilling the tanks.

The invention in one form is directed to a pneumatic agricultural product conveying system which includes a product supply chamber, a pneumatic source and a plenum with a plurality of outlets. The plenum normally receives air flow from the pneumatic source. A plurality of distribution lines extend from the plenum outlets to convey particulate material to an agricultural implement and to an agricultural field. A refilling system includes an elongated conduit having an inlet near one end for occasionally receiving product from a supply source and an outlet near the other end for delivering product to the chamber to replenish the product supply in the chamber. An air source may include an air flow diverter intermediate the pneumatic source and the utilization implement for normally coupling the pneumatic source and implement, and occasionally directing air flow away from the implement and toward the conduit inlet of the filling system. A dedicated air source for the filling system may alternatively be employed. A venturi box has an air inlet coupled to the air flow source and an outlet coupled to the filling system conduit one end providing a region of reduced air pressure to draw product from the particulate material supply source into the air stream.

The invention in another form is directed to a method of replenishing the supply of a particulate agricultural material in the tank of a pneumatic agricultural material conveying system. Air from a pneumatic source is supplied to a hopper which functions as an agricultural material reservoir for the filling system. The supplied air passes through a restriction to create a region of increased air velocity and a so-called venturi effect. The venturi effect essentially creates a suction effect to minimize the contact friction of particles against the bottom portions of the hose and for ingesting as many particles as possible of agricultural material from the hopper providing an air entrained flow of material. This air flow and material particles are conveyed to the tank where the material is deposited and excess air vented. Venting of air without particles may be to any suitable location. In one embodiment, air venting can be to a diffuser. In another embodiment, air venting may be back into the material conveying system closely adjacent the location from which it was supplied.

In a further form, the invention is directed to an air cart having a pneumatic source for supplying a flow of air entrained agricultural product from a product tank to be applied by a utilization implement to an agricultural field. There is an elongated conduit having an inlet near one end for occasionally receiving product from a supply source and an outlet near the other end for delivering product to the tank to replenish the product supply in the tank. An assembly (venturi box) that can contain one or a multiplicity of venturi sections has an air inlet adapted to be coupled to the cart or other pneumatic source and an outlet coupled to the conduit one end for drawing product from the supply source into an air flow from the pneumatic source. The pneumatic source may be a dedicated independent device or may be implemented by an air flow diverter intermediate the pneumatic source and the utilization implement which normally couples the pneumatic source and implement, and occasionally directs air flow away from the implement and to the venturi box air inlet.

An advantage of the present invention is minimizing seed damage during a tank filling or refilling operation.

Another advantage is an effective treatment of the residue in exhaust air from the filling system to minimize the exposure of seed dust to operators.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
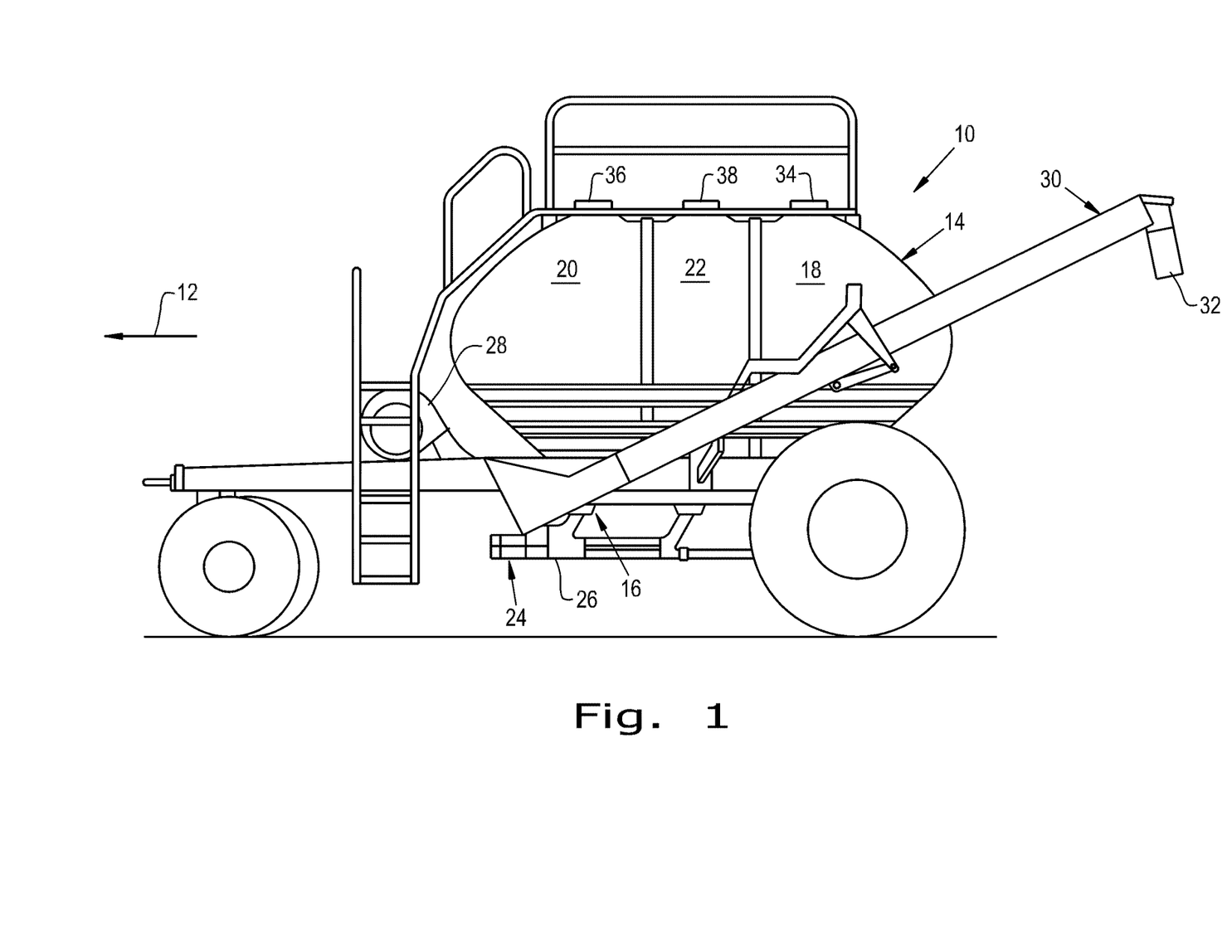
FIG. 1 is a side view of an air cart part of an air seeder equipment, and may include an air conveying system for filling and refilling the cart tank according to the present invention.

Referring now to the drawings, and more particularly to FIG. 1, there is shown an air cart comprising a portion of a known pneumatic agricultural product distribution system which generally includes a traction unit (not shown) which may be coupled to air cart 10 for towing the air cart 10 in the direction of arrow 12. The system usually includes as a third unit, a utilization implement such as an air drill (not shown) for seeding, cultivating and/or fertilizing operations. Air carts can be tow-between or tow-behind the traction unit. A tow-between cart has the advantage of the drill being the last implement over the field and do not leave tire prints behind. A tow-behind cart has the advantage of the drill being closer to the traction unit for improved viewing of the seeding operation. As is known in the art, the air cart 10 has one or multiple large tanks 14 which store a certain quantity of particulate material, e.g., seed and/or inoculant, or fertilizer, and a metering system 16 that meters the particulate material from the tank or tanks 14 to the air drill. The tank 14 may comprise a single compartment or several compartments, such as 18, 20, and 22. Multiple compartment tanks provide the option of performing multiple operations, e.g., seeding and fertilizer application in a single pass. In addition to being mechanically linked with the air drill, the air cart 10 and the air drill are interconnected by an air/product delivery system which includes tubing and/or hoses such as distribution lines 24. Air is supplied to the product delivery system via a manifold 26 or plenum by a fan assembly 28 sometimes mounted adjacent the front of the tank 14 and near the metering unit 16. Alternately, the fan assembly 28 may be mounted rearward of the tank or adjacent a side of the tank. As known in the art, the fan creates a turbulent air flow that carries particulate material metered by metering system 16 into and along distribution lines 24 to the utilization implement for applying the air entrained product to an agricultural field.

The supply of particulate material in the tank 18 is occasionally replenished from a supply vehicle by an auger or belt conveyor 30 shown in the stowed position. The auger is pivotably fixed to the cart 10 and has its outlet 32 aligned with the appropriate tank lid 34, 36 or 38 during a refilling operation. As mentioned earlier, this auger conveyor system may cause significant damage to the material being conveyed due to its aggressive mechanical geometries and operational settings.

Figure 2:
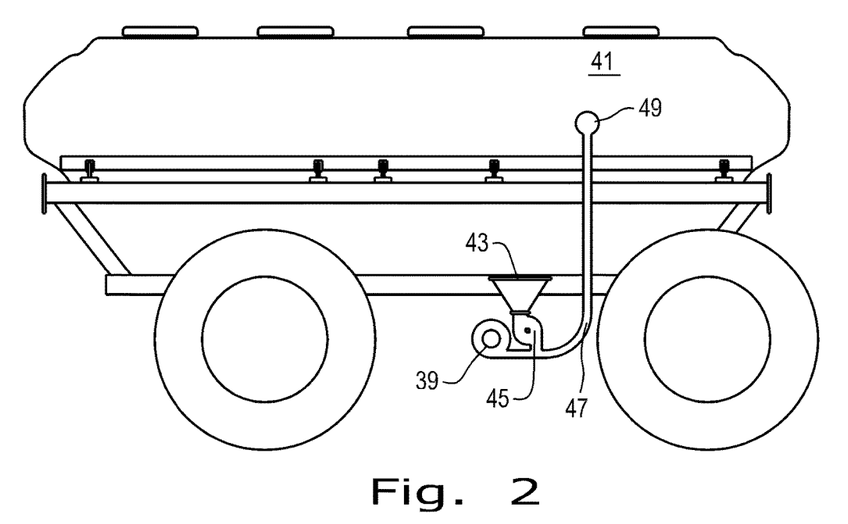
FIG. 2 is a side view of an air cart similar to that of FIG. 1, but showing an air filling system with a dedicated pneumatic source.
Figure 3:
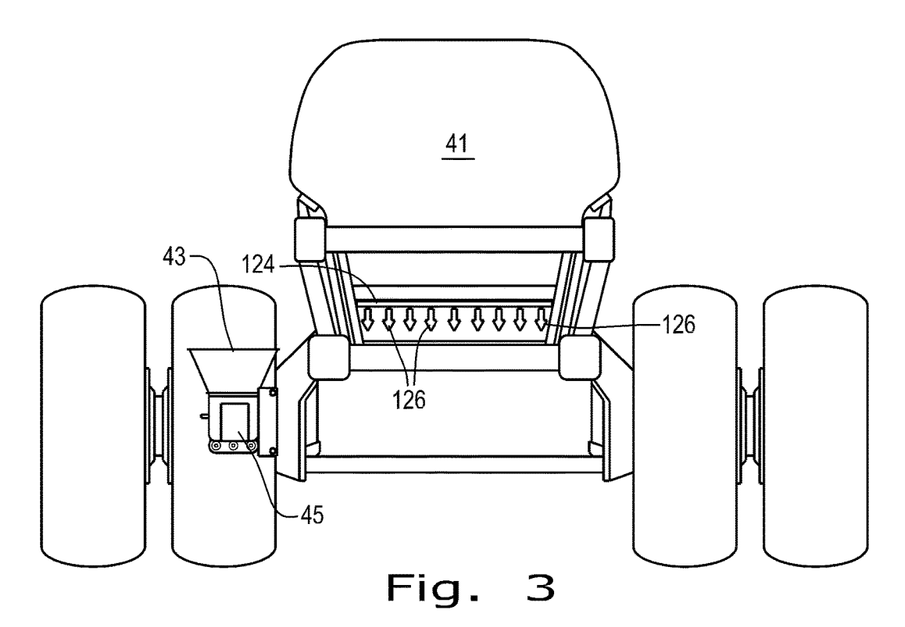
FIG. 3 is a front view of an air cart showing the air filling system of FIG. 2 and an exhaust air diffuser.

In FIGS. 2 and 3, the auger is replaced by an air material conveying system employing a dedicated fan 39 and motor. The supply of particulate material in the cart tank 41 is replenished from a hopper 43 which receives material, for example, by gravity flow, from a supply source such as a truck or other delivery vehicle. The material passes through a rotary feeder or air lock mechanism 45, and passes upwardly through hose 47 and, from tank outlet 49, into the tank 41. The end view of FIG. 3 includes an exhaust air diffuser to be discussed later.

Figure 4:
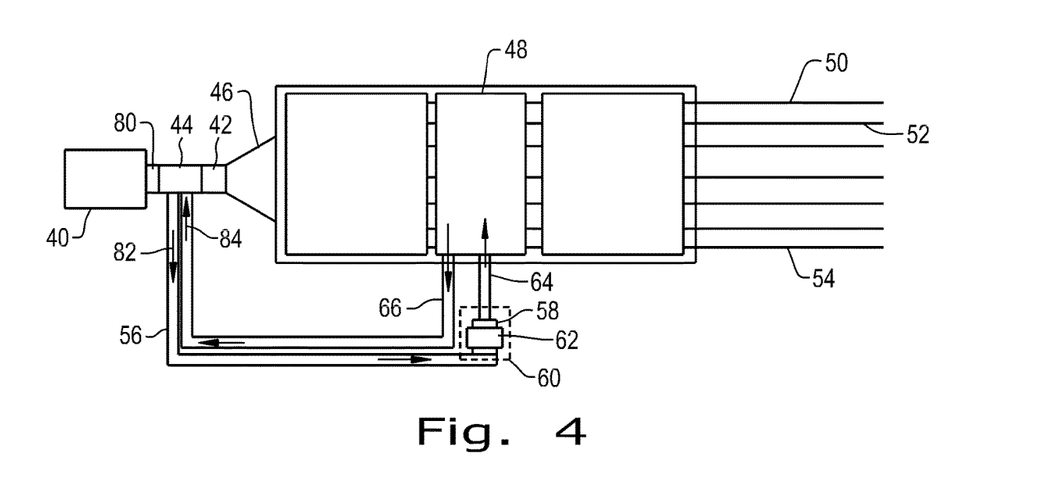
FIG. 4 is a schematic representation of a pneumatic agricultural product conveying system incorporating the present invention in one form.

In FIG. 4, the product conveying system employs an air flow diverter such as the two-way valve 44 at the fan outlet intermediate the conduit portions leading to the plenum 46. During normal operation for material distribution from the tank 48, air flows to the implement from the fan 40, the two-way valve 44 and conduit 42 to the plenum 46. Particulate material is delivered from a metering device, such as 16 of FIG. 1, to the several air/product distribution lines such as 50, 52 and 54 and to a utilization implement such as an air drill (with openers or ground engaging tools).

Occasionally the material in tank 48 requires replenishing. This is accomplished by directing air flow away from the implement. Valve 44 directs air flow by way of conduit 56 to an assembly containing multiple venturis shown as venturi box 58. A supply source such as the agricultural material reservoir or hopper 60 provides, by way of an air lock or rotary feeder 62, a material flow to be mixed with the air passing into the venturi box 58. The air entrained material is then conveyed by conduit 64 to replenish the material in the tank 48. The material particles settle in the tank and exhaust air is returned to the valve 44 and conduit 42 by way of conduit 66 to be diffused at a lower air speed through the product conveying system.

Figure 5:
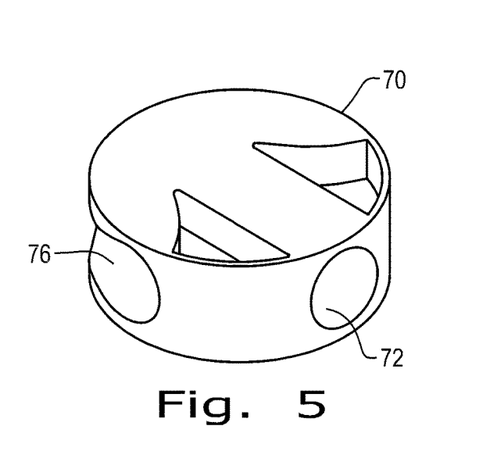
FIG. 5 is an isometric view of the rotor of an exemplary two-way valve for the system of FIG. 4.
Figure 6:
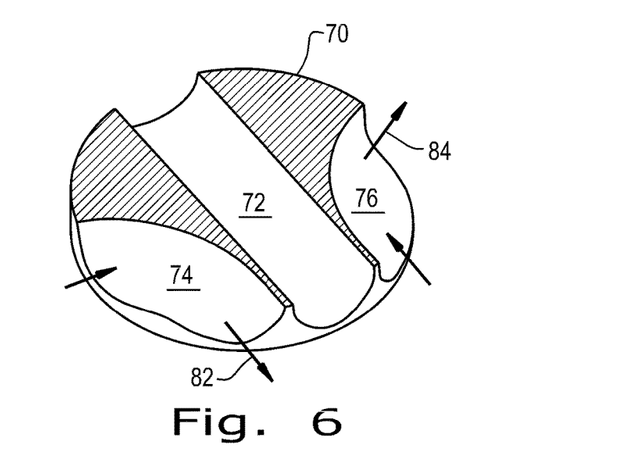
FIG. 6 is a cut-away isometric view of the rotor of FIG. 5 from a different perspective.
Figure 7:
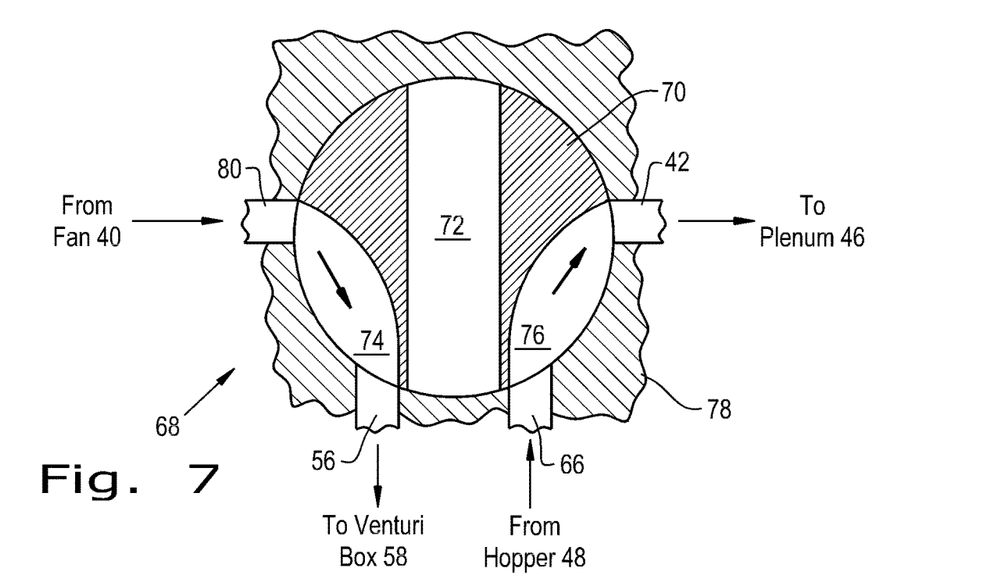
FIG. 7 is a top view of the rotor of FIG. 6 disposed in a suitable valve housing.

Valve 44 may take the form shown in FIGS. 5-7. Plug valve 68 has a rotor or plug 70 with a transverse passageway 72 normally providing air flow from the pneumatic source 40 to the plenum 46. The rotor 70 also has a pair of sculptured regions 74 and 76 which, when the valve is in the replenish position of FIG. 7, cooperate with valve housing 78 to divert air flow 82 from the fan 40 by way of conduit 80, region 74 and conduit 56 to the venturi box 58. In this same position, exhaust air return 84 from the tank passes through conduit 66, region 76 and conduit 42 back to the plenum 46. Rotation of the rotor 70 by ninety degrees in either direction aligns the passageway or bore 72 with the conduits 80 and 42 for normal operation. A similar two-way valve function may be achieved by a flow divider box as illustrated in FIGS. 8-11.

Figure 8:
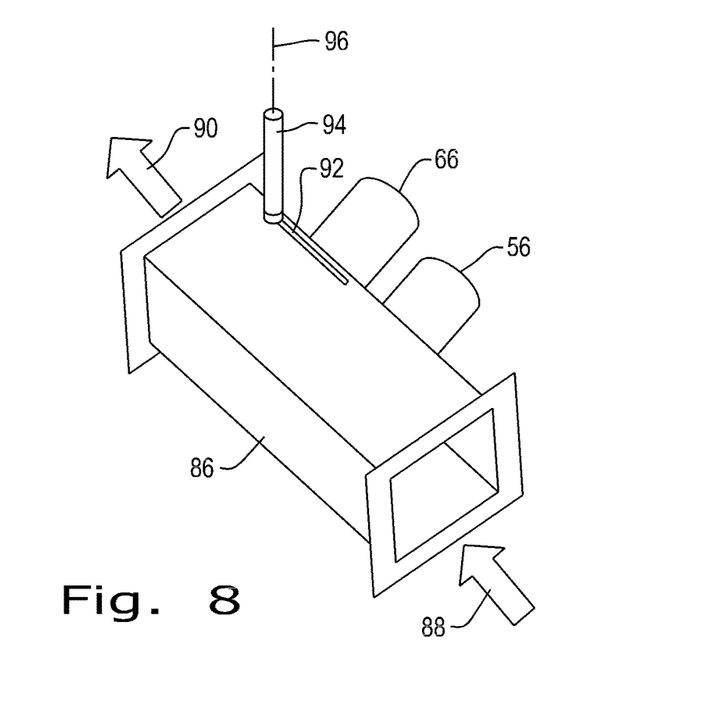
FIG. 8 is an isometric view of a flow divider box forming an alternate two-way valve for the system of FIG. 4.
Figure 9:
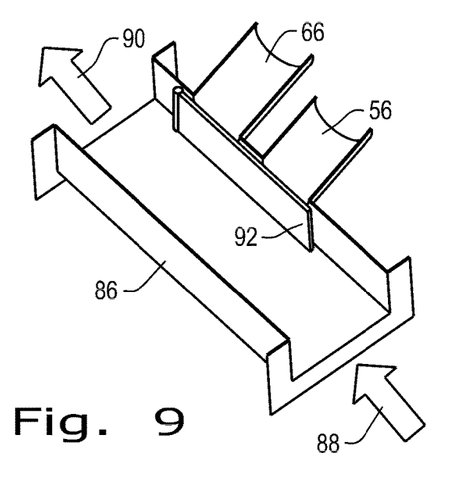
FIG. 9 is a cut-away isometric view of the flow divider box of FIG. 8 in the normal seeding or fertilizing position.
Figure 10:
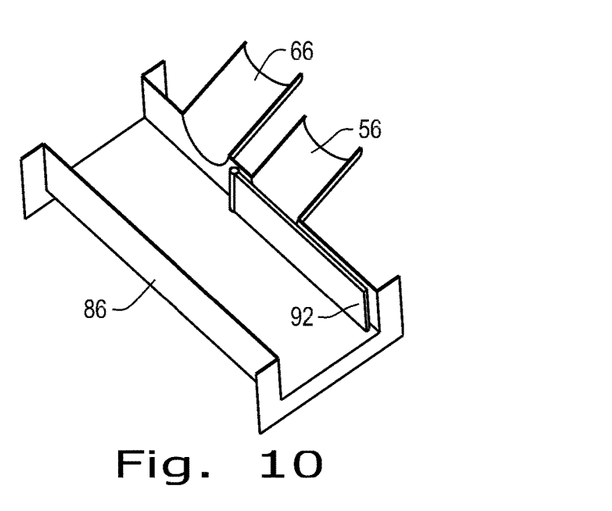
FIG. 10 is cut-away isometric view of the divider box of FIGS. 8 and 9 transitioning from the normal position to a tank replenishing position.
Figure 11:
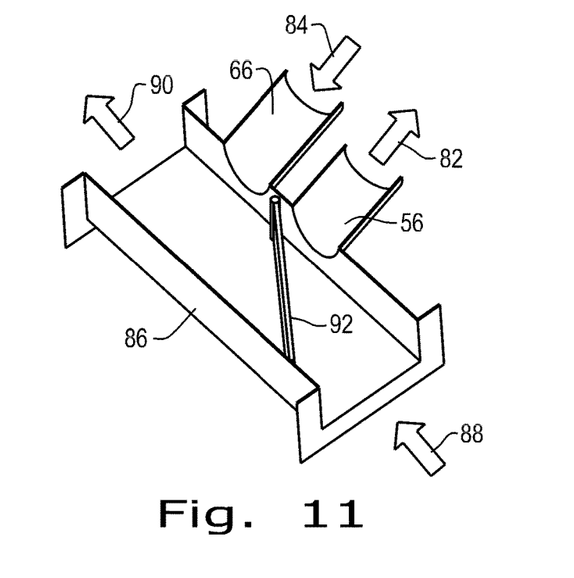
FIG. 11 is a cut-away isometric view of the divider box of FIGS. 8 and 9 in the tank replenishing position.

FIG. 8 shows the flow divider as a rectangular conduit 86 with fan air entering at 88 and flowing to the plenum at 90. Air supply line 56 and air return line 66 are coupled to the side of the conduit. An internal baffle 92 normally closes conduits 56 and 66 as shown in FIG. 9. The baffle may be slid from the position of FIG. 9 to that of FIG. 10 and subsequently pivoted about the axis 96 of control rod 94 to the location shown in FIG. 11 to divert incoming air 88 to the venturi box as shown by arrow 82. Exhaust air 84 in conduit 66 enters the conduit 86 and exits downstream at 90.

Figure 12:
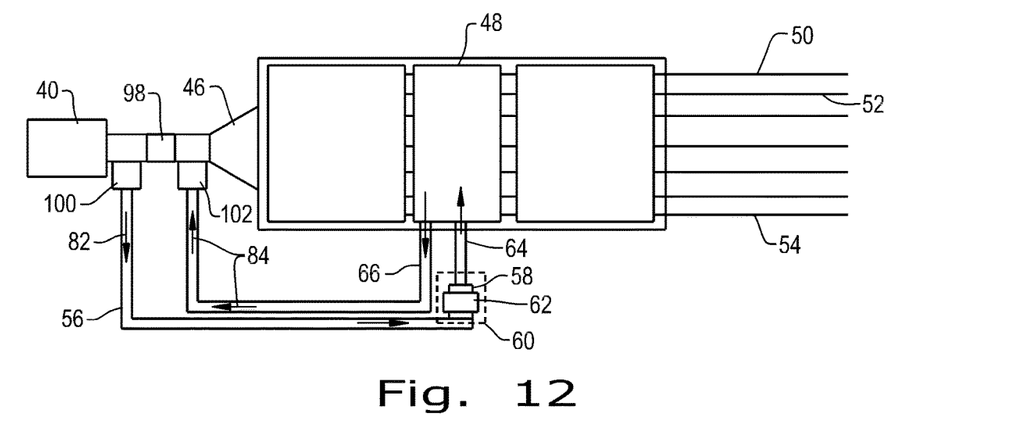
FIG. 12 is a schematic representation of an air conveying system similar to FIG. 4, but employing a different valving configuration.

FIG. 12 illustrates a pneumatic agricultural product conveying system similar to that of FIG. 4, but employing different air flow diverter valves. During normal product delivery, e.g., seeding or fertilizer application, air flows from fan 40 through one-way (open or closed) valve 98 and into the plenum 46. Thereafter, the agricultural material is metered to and becomes entrained in the air flow which is apportioned among the several distribution lines such as 50, 52 and 54 for application to a field. The filling system is activated by closing valve 98 and opening valves 100 and 102 thereby diverting the air flow, as indicated at 82, to the venturi box 58 where product is drawn from a supply source 60 and into the air flow. The replenishing flow of product is deposited in the tank and exhaust air flows back into the conveying system through open valve 102. Operation of the three valves are mutually dependent so that when valves 100 and 102 are open, valve 98 is closed. Upon completion of the refilling process and to resume material distribution, valves 100 and 102 are then closed and valve 98 opened.

Figure 13:
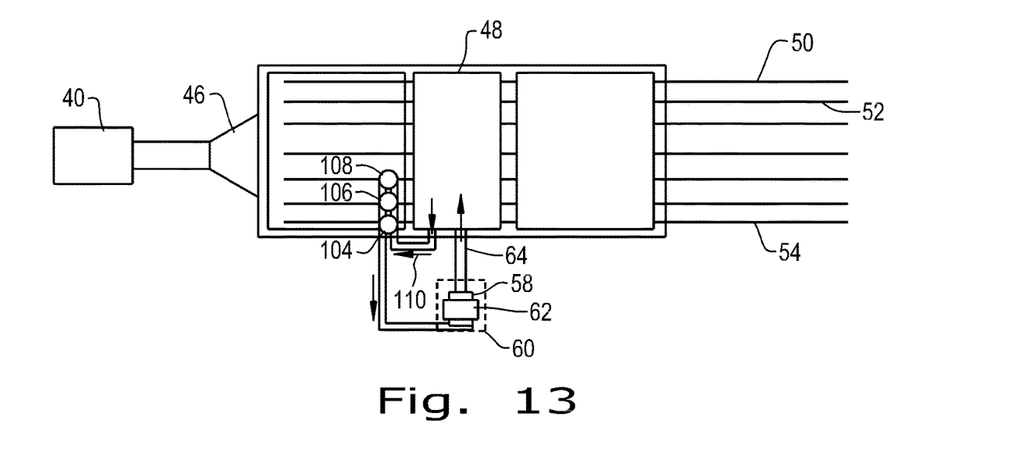
FIG. 13 is a schematic representation of an air conveying system similar to FIG. 4, but utilizing an alternate air supply location closer to the tank.

FIG. 13 shows another variation on the product conveying system. Here the air flow is diverted later in the system to reduce the length of hoses required. Air flow with material already entrained is diverted from certain ones of the air/product distribution lines (here 54, for example) by multiple two-way diverter valves 104, 106 and 108. The valves of FIGS. 5-7 or of FIGS. 8-11 are suitable, but other suitable valving arrangements maybe employed. Exhaust air is returned through a hose as shown by arrow 110 to the same certain distribution lines. Operation is otherwise as previously described, however, if, for example, a seeding operation and a replenishing operation are taking place at the same time, there may exist a preferential air flow in the distribution lines such as 50 and 52 which are not connected to the replenishing system. This problem may be minimized by including a movable baffle within the plenum as shown in FIGS. 14 and 15.

Figure 14:
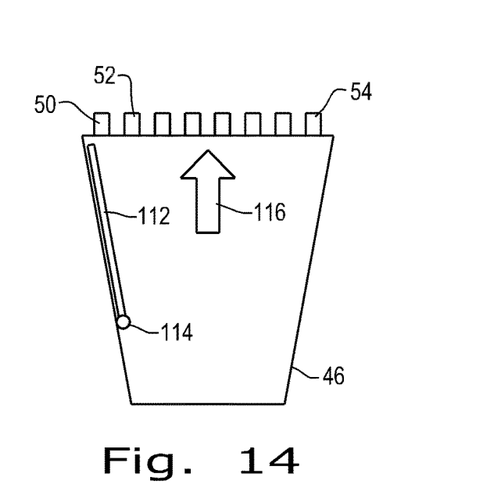
FIG. 14 is a simplified view of the plenum of FIG. 13 showing a flow deflector in the normal seeding or fertilizing position.
Figure 15:
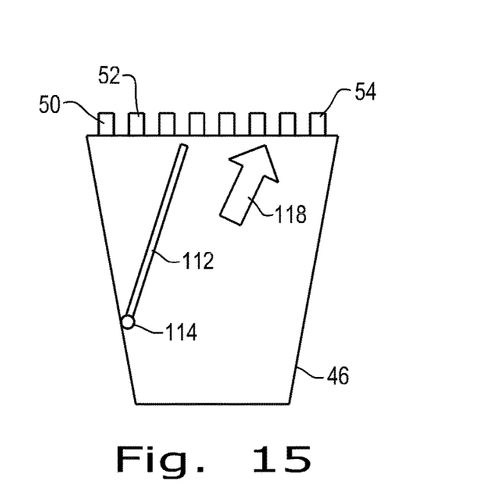
FIG. 15 is a view of the plenum of FIG. 14 showing a flow deflector in a tank filling position.

During normal product delivery, the baffle 112 assumes the position shown in FIG. 14. When valves 104, 106 and 108 are changed to their replenish condition, to minimize preferential air flow to the non-participating distribution lines, baffle 112 is pivoted about a hinge 114 to the position shown in FIG. 15 and air flow through the plenum is diverted. Arrow 116 indicates normal air/product delivery while arrow 118 shows the replenish condition where the flow tends more toward the valved distribution lines such as 54.

Figure 16:
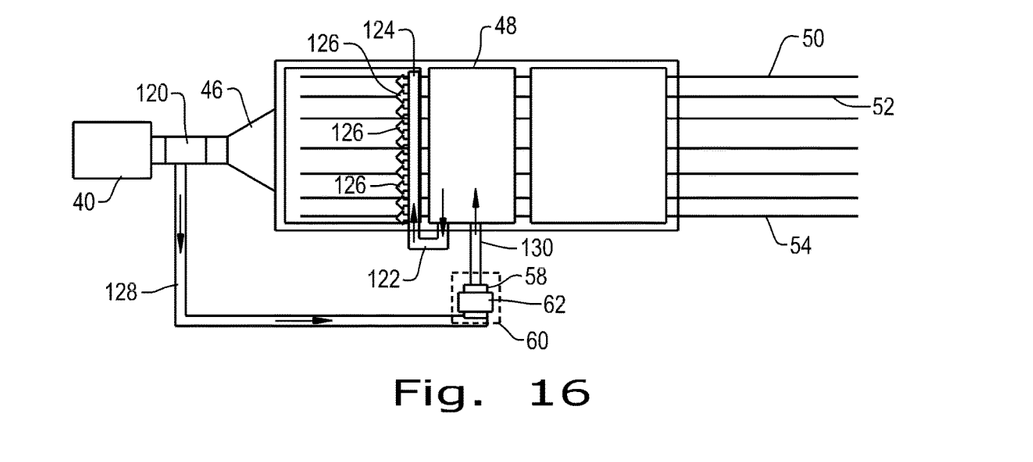
FIG. 16 is a schematic representation of an air conveying system similar to FIG. 4, but utilizing an alternate configuration for venting air from the tank.

FIG. 16 illustrates a pneumatic agricultural product conveying system similar to that of FIGS. 4 and 12, but employing a different exhaust air technique. During normal product delivery e.g., seeding or fertilizer application, air flows from fan 40 through two-way valve 120 and into the plenum 46. Thereafter, the agricultural material is metered to and becomes entrained in the air flow which is apportioned among the several distribution lines such as 50, 52 and 54 for application to a field as before. The filling system is activated by changing valve 120 thereby diverting the air flow from the plenum as indicated, to the venturi box 58 where product is drawn from a supply source 60 and into the air flow. The replenishing flow of product is deposited in the tank and exhaust air flows from the tank through conduit 122 and downwardly to diffuser 124 from which it is evacuated toward the ground at low velocity through a plurality of laterally spaced apart outlets as shown by arrows 126 in FIGS. 3 and 16. When the exhaust air is diffused in this way, or, as described earlier, returned to the flow going to the implement, operator exposure to undesirable chemicals or other remaining particles is minimized.

Figure 17:
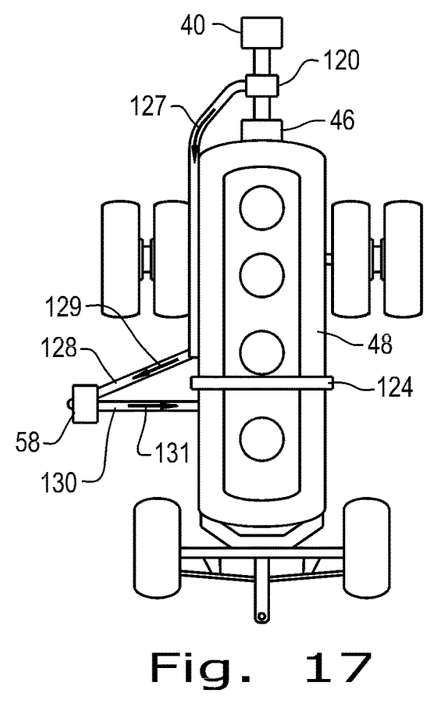
FIG. 17 is a top view of an air cart schematically showing the product replenishing flow paths and air diffuser of FIG. 16.

In FIGS. 16 and 17, air flow from the fan 40 is diverted by two-way valve 120 through conduit 128 to the venturi box 58 as indicated by arrows 127 and 129. From venturi box 58, air entrained agricultural product flows through conduit 130 as indicated by arrow 131 into tank 48. Exhaust air is released from tank 48 through diffuser 124. Two-way valve 120 may be implemented as a pair of simple one-way (open or closed) valves similar to those in FIG. 12 or by any other suitable technique, for example, as shown in FIG. 18.

Figure 18:
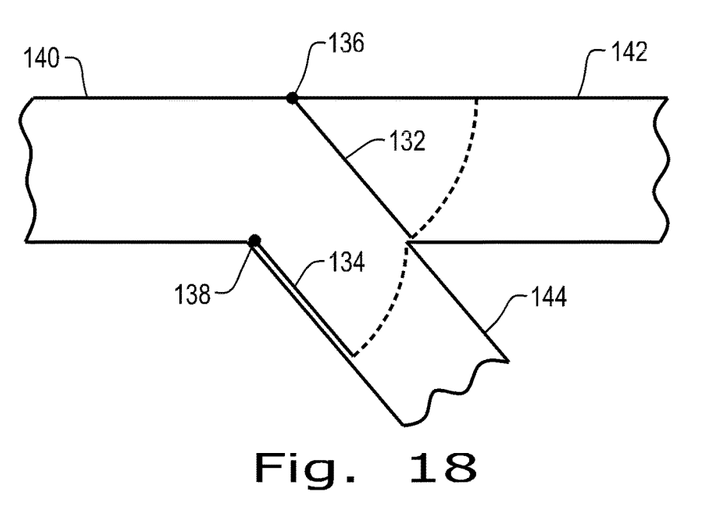
FIG. 18 is a schematic representation of a two-way valve for the system of FIG. 16.

In FIG. 18, a pair of flow divider baffles 132 and 134 are pivotable about their respective hinges 136 and 138. In the horizontal position, air may flow from conduit 140 to conduit 142. In this position, air flow into conduit 144 is blocked by baffle 134. The baffles may be pivoted in unison as indicated by the dotted lines to a position where baffle 132 blocks any air flow into conduit 142 while baffle 134 allows air flow into conduit 144.

Figure 19:
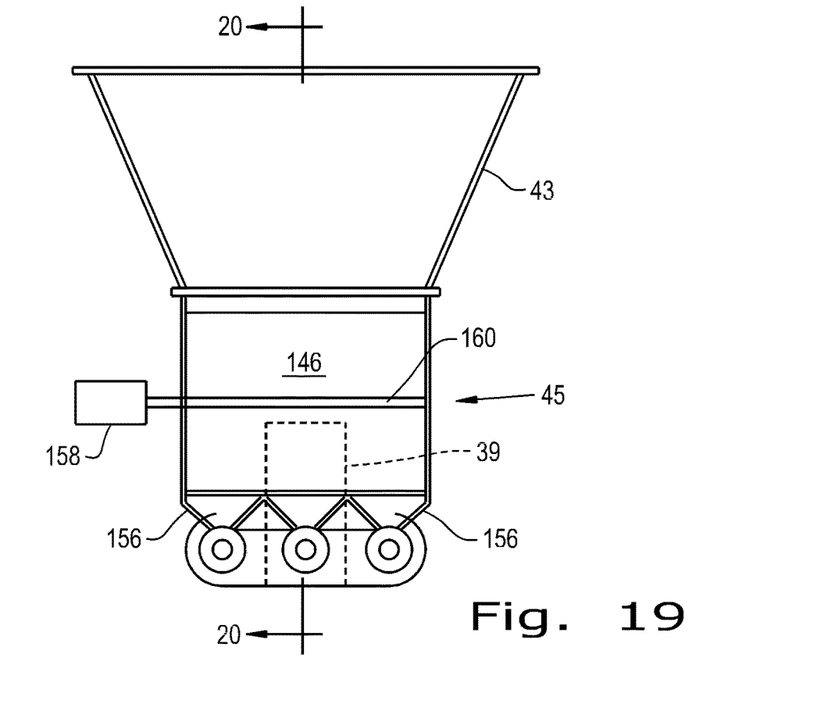
FIG. 19 is a schematic cross-sectional representation of an air lock and venturi box which may be employed in any configuration as illustrated in FIGS. 2, 3, 4, 12, 13, 16 and 17.
Figure 20:
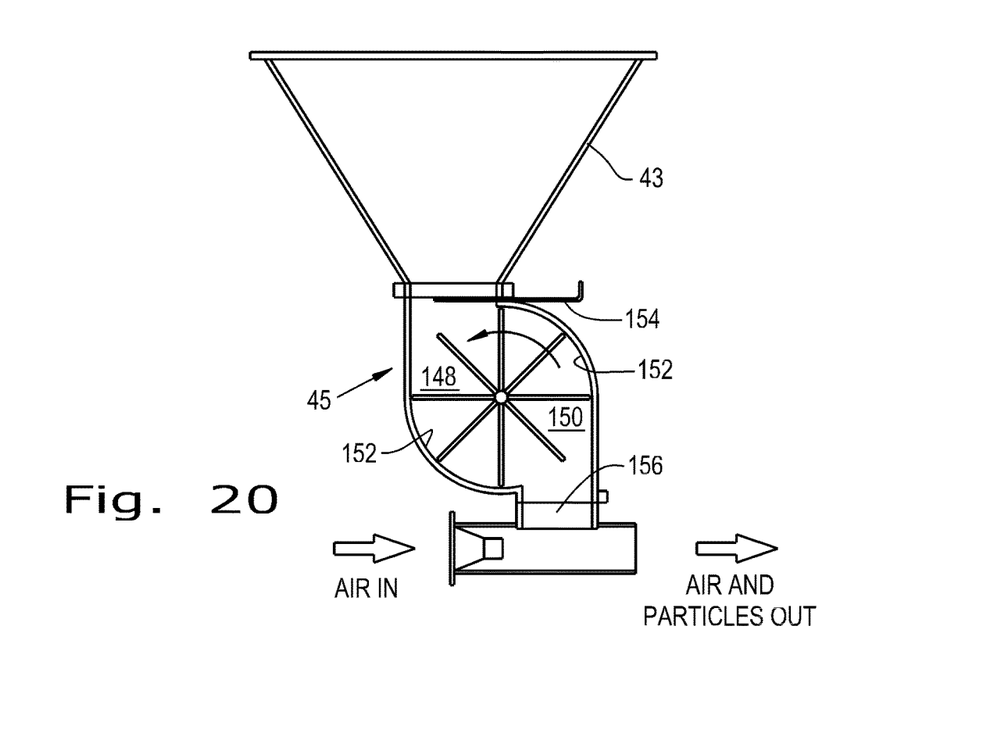
FIG. 20 is a cross-sectional view along lines 20-20 of FIG. 19.

FIGS. 19 and 20 show one implementation of the air lock or rotary feeder 45 and venturi box. FIG. 20 is a cross-sectional view along lines 20-20 of FIG. 19. The air lock has a cylinder 146 rotatable about an axis in a counter-clockwise direction as shown by the arrow. The cylinder 146 has a plurality of wedge-shaped pockets such as 148 and 150 which take on product from the source 43 when opening upwardly and release product downwardly into the venturi region after about one-half revolution. The cylinder fits within cylindrical sidewalls 152 sufficiently closely to prevent any significant air passage. There is a seed gate 154 for controlling the flow of particulate material from the hopper 43 into the upper wedge shaped segments (roughly those between the nine and twelve o'clock positions). The inlet in the region of the seed gate is offset somewhat to aid in avoiding pressure loss from the venturi. At around a five o'clock position, the material falls from the wedge shaped segments. Thus, as shown, segment 148 would be filled with material from the tank while segment 150 has emptied material which is funneled by seed ramps such as 156 into the venturi region below and transported using air from fan

39. A motor 158 is enabled to cause the cylinder 146 to rotate about axle or shaft 160 delivering material to the venturi region. In an alternative embodiment, the cylinder 146 may be free to rotate in much the same way as an overshot water wheel due to off axis material weight.

Three different scenarios for supplying air to the filling system have been discussed. Air may be diverted at the air cart fan outlet, or may be diverted later in the system from nearby hoses. An independent or dedicated fan and motor may be employed. Further, three techniques for exhaust air treatment are disclosed. Exhaust air may be returned to the air cart product conveying system immediately downstream of the air cart fan, or returned later in the product conveying system. Also, exhaust air may be simply directed downwardly through a diffuser beneath the air cart. Several combinations of these techniques have been explained and others will be readily apparent.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of replenishing a supply of a particulate agricultural material in a tank of a pneumatic agricultural material conveying system, the method comprising:
    supplying air from a pneumatic source to an agricultural material reservoir;
    providing a valve operatively connected to the pneumatic source and the tank, the valve including a rotor having a transverse passageway providing air flow from the pneumatic source therethrough and to the tank, the rotor also including a first region and a second region which are each configured to permit airflow therethrough;
    providing a valve housing which cooperates with the transverse passageway, the first region and the second region of the rotor of the valve in the valve housing to selectively direct air flow through or block air flow in the transverse passageway, the first region, and the second region when the rotor is positioned in a normal operating position and a replenishing position;
    positioning the rotor in the replenishing position relative to the valve housing to block air flow through the transverse passageway and to permit air flow in a first direction through the first region and to permit air flow in a second direction through the second region;
    passing air in the first direction through the first region of the rotor and through a restriction operatively coupled to the rotor, the agricultural material reservoir, and the tank to create a region of increased air velocity and reduced air pressure for ingesting agricultural material from the agricultural material reservoir and providing an air entrained flow of material;
    conveying the flow of air entrained material to the tank;
    depositing the material in the tank;
    simultaneously moving exhaust air from the tank in the second direction through the second region of the rotor; and
    venting exhaust air from the tank.

2. The method of claim 1, wherein the step of supplying air includes diverting at least part of the air flow from a normal material distribution path through the transverse passageway.

3. The method of claim 1, wherein the step of venting includes returning the exhaust air from the tank to the pneumatic agricultural material conveying system.

4. The method of claim 3, wherein the step of venting includes returning the exhaust air to a location closely adjacent the location from which it was diverted.

5. The method of claim 3, wherein the step of venting further includes the step of passing a portion of the exhaust air from the tank downward to an air diffuser beneath the tank.

6. The method of claim 1, wherein the step of positioning the rotor in the replenishing position includes rotating the rotor within the valve housing to block airflow within the transverse passageway and open airflow through the first region and the second region.

7. The method of claim 1, comprising the step of positioning the rotor in the normal operating position from the replenishing position to permit airflow only through the transverse passageway by rotating the rotor ninety degrees in either direction within the valve housing to block airflow through the first region and the second region of the rotor.

* * * * *